United States Patent [19]
Bell et al.

[11] Patent Number: 5,697,329
[45] Date of Patent: Dec. 16, 1997

[54] COLOR CODED SAFETY BELT OR HARNESS TO INDICATE THE AGE THEREOF

[75] Inventors: Michael Bell, 1705 Triumphe Way, Warrington, Pa. 18976; Jonathan Marc Bell, Philadelphia, Pa.

[73] Assignee: Michael Bell, Warrington, Pa.

[21] Appl. No.: 574,051

[22] Filed: Dec. 18, 1995

[51] Int. Cl.⁶ .......................... A62B 35/00; B60R 22/00
[52] U.S. Cl. ..................... 119/857; 182/3; 244/151 R
[58] Field of Search ....................... 119/857, 858, 119/770; 244/151 R, 142; 182/3, 6, 18

[56] References Cited

U.S. PATENT DOCUMENTS

| | | | |
|---|---|---|---|
| 3,857,139 | 12/1974 | Turner | 24/30.5 T |
| 4,223,918 | 9/1980 | Smoczynski | 283/7 |
| 4,913,136 | 4/1990 | Chong et al. | 128/80 A |
| 5,203,829 | 4/1993 | Fisk et al. | 119/96 |
| 5,263,495 | 11/1993 | Butterfield | 128/845 |
| 5,503,620 | 4/1996 | Danzger | 602/19 |

*Primary Examiner*—John G. Weiss
*Assistant Examiner*—Bruce E. Snow
*Attorney, Agent, or Firm*—Caesar, Rivise, Bernstein, Cohen & Pokotilow, Ltd.

[57] ABSTRACT

A color coded safety belt or harness to be worn by a person to protect the person from a fall and the method of making and using the belt or harness. The belt or harness is formed of first fibers of a predetermined first color, e.g., optical yellow, and also includes at least one color coded indicator fiber woven therein to indicate the year of the manufacture of the belt or harness. The indicator fiber is of a second color which contrasts with the color of the belt or harness fibers to enable the user of the belt or harness to determine if the belt or harness had been produced more than a predetermined number of years before so that a decision can be made by the user of whether or not to discard the belt or harness due to its age. The second color of the indicator fiber is a predetermined different color than the first color, and is changed in successive years, without repeating the second color.

8 Claims, 1 Drawing Sheet

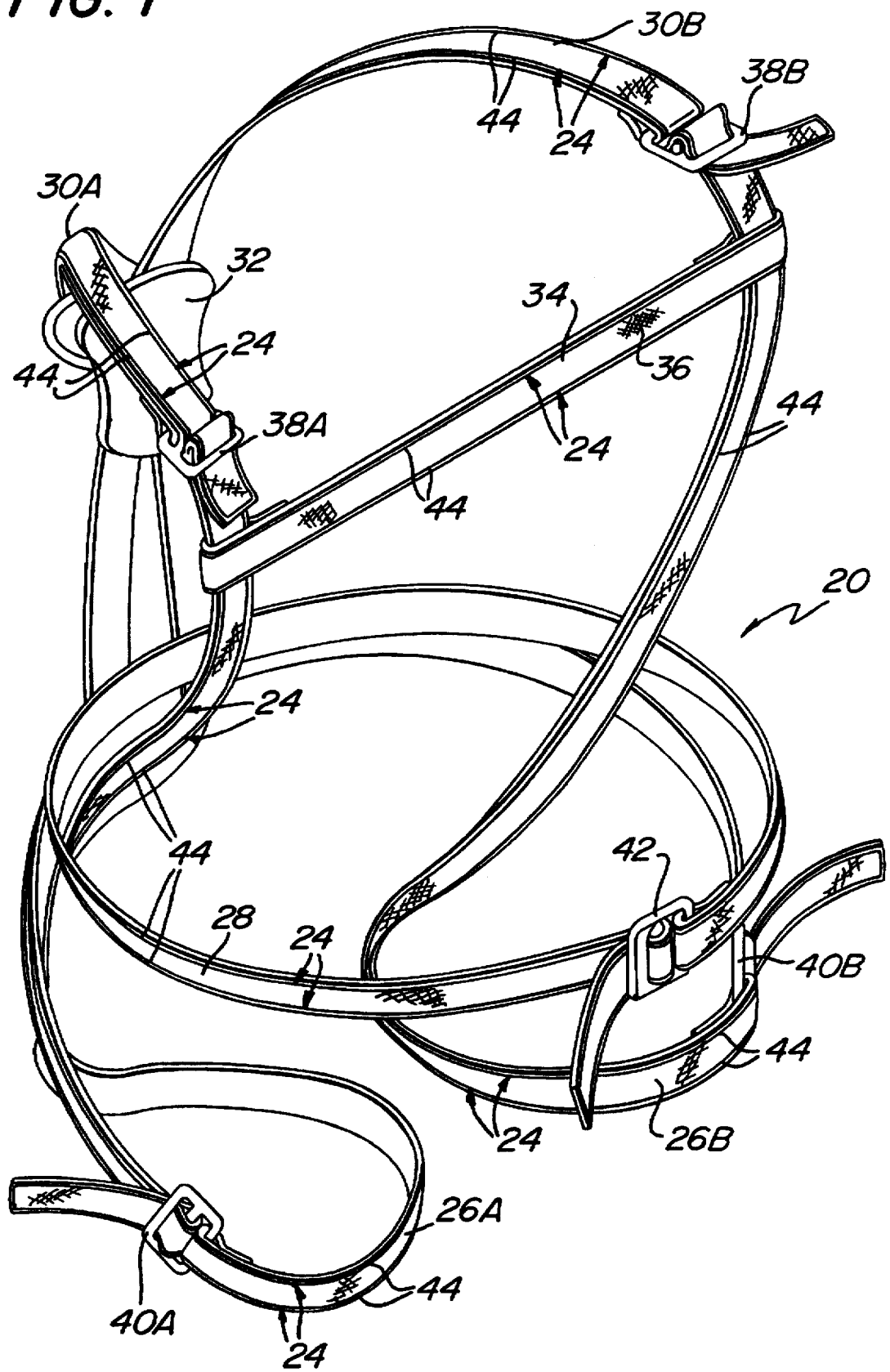

COLOR CODED SAFETY BELT OR HARNESS TO INDICATE THE AGE THEREOF

BACKGROUND OF THE INVENTION

This invention relates generally to safety apparatus and more particularly to safety belts or harnesses formed of a woven web of fabric and including color coded indicia to indicate the age of the belt or harness to determine if replacement is in order based on the age of the belt or harness.

Due to the enactment of various safety laws, persons working at elevated positions, e.g., when washing the upper story windows of a building, etc., are required to be protected against falls. One common approach to achieve that end is the use of a safety belt which is worn on the worker's waist or a harness worn on the worker's torso. The belt/harness is typically formed of a woven web of synthetic fabric, e.g., nylon, polyester, etc., and typically includes a D-ring or some other metal loop fixedly mounted on it. The D-ring is arranged to be connected, via a lanyard, to a "rope grab" device which is mounted on a safety line. The safety line typically comprises a rope, cable or other type of strong line which extends vertically from a fixed elevated anchor point downward past the point at which the worker is located. In fact in many applications the line extends all the way to the ground. The rope grab is arranged to slide along the safety line to follow the worker up or down the structure on which the worker is working. In the event that the worker should fall off of the structure the rapid downward pull on the rope grab caused by the momentum of the worker causes the rope grab to automatically immediately engage and lock itself into a fixed position on the safety line, thereby arresting the worker's fall and supporting him/her until he/she can be rescued.

The fibers making up the webs of the belt or harness degrade over time due to various factors, e.g., exposure to the elements and ultraviolet radiation. Hence, it becomes prudent from a safety standpoint to replace all safety belts or harnesses which are older than some predetermined conservative age.

Some manufacturers of safety belts or harnesses have included labels or tags thereon indicating the year of manufacture, so that by examining that label or tag the age of the belt or harness can be determined. Unfortunately, such labels or tags may become dislodged from the belt or harness or otherwise become illegible, particularly, if the belt or harness is subjected to heavy use over a protracted period of time in dirty or rugged environments.

Some safety harnesses or belts which are commercially available have made use of fibers of a contrasting color or appearance woven into the body of the strap(s) making up the harness or belt. These fibers are not visible if the harness or belt is intact, but become visible if the harness or strap should become worn away, such as by abrasion. If such fibers become visible that indicates that the harness/belt should be replaced or refurbished. However, such harnesses/belts do not include means for indicating the age of thereof (unless they make use of the aforementioned labels/tags indicating the manufacture date).

Thus, the need exists for a safety belt and/or safety harness to include secure and permanent means for providing visually readily distinguishable indicia to indicate the age of the belt or harness.

OBJECTS OF THE INVENTION

Accordingly, it is a general object of this invention to provide a safety belt or harness which fills that need.

It is another object of this invention to provide a safety belt or harness including color coding permanently a part of the fabric of the material making up the belt or harness to indicate the age of the belt or harness.

It is yet another object of this invention to provide a method of manufacturing a color coded safety belt or harness which will enable subsequent users to readily determine the age thereof by the color code thereof.

SUMMARY OF THE INVENTION

These and other objects of this invention are achieved by providing color coded safety belts or harnesses to be worn by workers to indicate the year of their manufacture, and the method of making and using the same. The color coding enables the user of the belt or harness to determine if the belt or harness had been produced more than a predetermined number of years before so that a decision can be made by the user to discard it if it is older than the predetermined number of years.

The method comprises the steps of manufacturing a safety belt or harness from of a web of fabric of a first predetermined color, e.g., optical yellow, and coloring a preselected portion of the web with a second color at the time that the belt or harness is manufactured, e.g., providing at least one thread of the second color in the web so that it can be readily seen.

The second color is a predetermined different color than the first color, and with the second color being changed in successive years, without repeating the second color.

DESCRIPTION OF THE DRAWINGS

Other objects and many attendant features of this invention will become readily appreciated as the same becomes better understood by reference to the following detailed description when considered in connection with the accompanying drawing wherein FIG. 1 shows a harness including a safety belt constructed in accordance with this invention.

DETAILED DESCRIPTION OF THE PREFERRED EMBODIMENTS

Referring now to the drawing where like reference numerals refer to like parts there is shown at 20 in FIG. 1 a harness constructed in accordance with this invention. The safety harness shown herein is merely exemplary of various types of harnesses arranged to be worn by a worker to be attached to a fixed anchor point (not shown) to thereby protect the worker from a fall. In fact, it should be pointed out that the subject invention is not limited to use in harnesses. Thus, the subject invention can be used in other fall-protection devices worn by a worker, e.g., a safety belt alone.

The harness 20 (or safety belt—to be identified later) is arranged to be connected to a fall prevention device, such as a conventionally commercially available rope grab (not shown) and/or a lowering device (not shown). Irrespective of the type of harness or safety belt employing the subject invention it includes age indicating means 24, which is forms a permanent, always readily visible, part of the belt or harness, so that by merely looking at the belt or harness one can determine its age. Thus, a user is provided with a ready and sure means of determining if the belt/harness is too old to be used further and should be replaced.

Before describing the details of the age indicating means 24 a brief description of the exemplary harness shown herein is in order. Thus, as can be seen the harness 20 is formed of webbing or straps which are connected together. In particular the harness 20 basically comprises a pair of straps 26A and 26B which are arranged in loops to encircle the wearer's thighs, a safety waist belt 28 or some other portion to encircle the wearer's waist, straps 30A and 30B extending over the wearer's shoulders and crossing over each other at a buckle 32 at approximately the center of the wearer's back, and a chest strap 34 connected between the chest straps 30A and 30B.

Each of the straps forming the harness is composed of high-strength fibers 36 of plastic or other type material, such as nylon or polyester, which are woven together or otherwise interlaced to form a single ply or multiply web. The straps are fixedly secured together, such as by stitching and various buckles (to be described hereinafter) to complete the harness. In this regard an adjustable buckle 38A is provided in the chest strap 30A and a similar buckle 38B is provided in the chest strap 30B. These buckles enable those straps to be adjusted for the wearer. In a similar manner an adjustable buckle 40A is provided in the leg strap 26A and a similar buckle 40B is provided in the leg strap 26B to enable those straps to be adjusted for the wearer. An adjustable buckle 42 is provided in the waist belt or strap 28 to enable the belt to be adjusted for the wearer.

In accordance with a preferred embodiment of this invention each of the straps making up the harness includes the heretofore identified age indicating means 24. That arrangement is not mandatory. Thus, as long as the harness 20 or safety belt 28 includes age indicating means 24 in at least one strap or portion of it which will always remain part of it, the objects of this invention will be achieved. However, as will be appreciated from the discussion to follow, the more straps which include the age indicating means 24, the better to ensure that age of the harness or belt can be readily determined.

The age indicating means 24 is basically comprises a least one differently colored fiber or strand 44 located on the exterior surface of the associated harness or belt strap. Preferably the fiber(s) 44 are woven or knitted into the fibers 36 making up the fabric of the strap or web so that it is an integral part thereof and located at the exterior surface. In the embodiment shown herein two such fibers 44 are interlaced into the fibers 36 and are located on the outer surface of each strap portion of the belt/harness and extend closely, e.g., ⅛ inch (3.2 mm) in from the respective outer edges of the strap portion.

The color of the age indicating fibers 44 is selected to be readily distinguishable from the color of the fibers 36 making up the web itself. Moreover, the color of the fibers 44 is changed each year for a predetermined number of years, e.g., five years. Thus, for example, for the five year period or "series" starting in 1995 the color of the fibers making up the straps of the harness are selected to be of a readily visible color, e.g., "optical yellow". However, the color coded age indicator fibers 44 for the belts or harnesses manufactured in the first year of the series, is a preselected, contrasting color, e.g., red. Thus, all belts or harnesses manufactured in 1995 will be optical yellow with red indicating fibers 44 extending along the marginal edges of the straps making up the belt or harness. The color coded age indicating fibers 44 for all belts or harnesses manufactured in the second year of the series is a second, different, preselected, contrasting color, e.g., blue. Thus, all belts or harnesses manufactured in 1996 will be optical yellow with blue indicating fibers 44 extending along the marginal edges of the straps making up the belt or harness. The color coded age indicating fibers 44 for all belts or harnesses manufactured in the third year of the series is a third, different, preselected, contrasting color, e.g., green. Thus, all belts or harnesses manufactured in 1997 will be optical yellow with green indicating fibers 44 extending along the marginal edges of the straps making up the belt or harness. The color coded age indicating fibers 44 for all belts or harnesses manufactured in the fourth year of the series is a fourth, different, preselected, contrasting color, e.g., purple. Thus, all belts or harnesses manufactured in 1998 will be optical yellow with purple indicating fibers 44 extending along the marginal edges of the straps making up the belt or harness. The color coded age indicating fibers 44 for all belts or harnesses manufactured in the fifth and last year of the series is a fifth, different, preselected, contrasting color, e.g., black. Thus, all belts or harnesses manufactured in 1999 will be optical yellow with black indicating fibers 44 extending along the marginal edges of the straps making up the belt or harness.

All belts or harness manufactured in the next year start a new (i.e., second) "series." In that cae the basic color of the straps, i.e., the color of the fibers 36, can be changed from the previous series, e.g., from optical yellow to optical orange. The color coded fibers 44 for the five years of this second series can then remain the same as that of the previous series since the background color will be different. Thus, all belts or harnesses manufactured in the first year of the second series, e.g., in 2000, will be optical orange with red indicating fibers 44 extending along the marginal edges of the straps making up the belt or harness. All belts or harnesses manufactured in the second year of the second series, e.g., in 2001, will be optical orange with blue indicating fibers 44 extending along the marginal edges of the straps making up the belt or harness. All belts or harnesses manufactured in the third year of the second series, e.g., in 2002, will be optical orange with green indicating fibers 44 extending along the marginal edges of the straps making up the belt or harness. All belts or harnesses manufactured in the fourth year of the second series, e.g., in 2003, will be optical orange with purple indicating fibers 44 extending along the marginal edges of the straps making up the belt or harness. All belts or harnesses manufactured in the fifth year of the second series, e.g., in 2004, will be optical orange with black indicating fibers 44 extending along the marginal edges of the straps making up the belt or harness. The next series can be similarly constructed with a different background color, and so on.

It should be pointed out at this juncture that different color coding can be utilized. Thus, for the second series, the background color (i.e., the color of the fibers 36) can remain optical yellow. In such a case the age indicator fibers 44 will have to be different than the red, blue, green, purple, and black, of the first series. Moreover, the number of years in the series can be selected to be other than five. Thus, each series may comprise decade.

In any event it is contemplated that information about the specific color coding which is used be widely disseminated to all users and potential users of the belts or harnesses. For example, information describing the color coding can be provided through industry trade publications or standards. In addition, such information should be provided with the belts or harnesses when they are purchased. This is preferably accomplished by literature accompanying the belts or harnesses and tags or labels fixedly secured to the belts or harnesses describing the color code. Thus, once the particular code is known, all that the user has to do is to look at the belt or harness and he/she can immediately determine the age thereof.

For example, utilizing the exemplary five year series described above, if it is in the year 2002 and the safety belt or harness being examined to determine its age is of optical yellow background (i.e., optical yellow fibers 36) with blue indicator fibers 44, the user will immediately know that the belt is at least six years old, i.e., it was manufactured in 1996. Thus, the user can decide if the belt or harness is to be discarded based criteria either established by the industry, government, or his/her employer, as the case may be.

Without further elaboration the foregoing will so fully illustrate our invention that others may, by applying current or future knowledge, adapt the same for use under various conditions of service.

We claim:

1. A method for producing a color coded safety belt or harness to be worn by a worker to indicate the year of its manufacture, said color coding enabling the user of the belt or harness to determine if the belt or harness had been produced more than a predetermined number of years before, said method comprising the steps of:

(a) manufacturing said safety belt or harness from a web of fabric of a first predetermined color, and (b) coloring a preselected portion of said web with a second color at the time that said belt or harness is manufactured, said second color being a predetermined different color than said first color, and with said second color being changed in successive years for a predetermined number of years, without repeating said second color.

2. The method of claim 1 wherein said first predetermined color is changed at the end of said predetermined number of years.

3. The method of claim 1 wherein said safety belt or harness is formed of plural interlaced threads of said first predetermined color, and wherein said preselected portion of said web comprises threads of said second predetermined color secured to said first threads.

4. The method of claim 3 wherein said preselected portion comprises a marginal edge of said web.

5. A method for determining the age of a safety belt or harness to be worn by a worker, said method comprising the steps of:

(a) providing a safety belt or harness manufactured in one year from a web of fabric of a first predetermined color, and having a preselected portion of said web of fabric of a second color, said second color being a predetermined different color than said first color, (b) changing said second color of each belt or harness manufactured in succeeding years, without repeating said second color, and (c) utilizing the second color to determine the age of said belt or harness in order to determine if the belt or harness should be discarded because of the age thereof.

6. The method of claim 5 wherein said first predetermined color is changed at the end of a predetermined number of years.

7. The method of claim 5 wherein said safety belt or harness is formed of plural interlaced threads of said first predetermined color, and wherein said preselected portion of said web comprises threads of said second predetermined color secured to said first threads.

8. The method of claim 7 wherein said preselected portion comprises a marginal edge of said web.

* * * * *